(12) United States Patent
Kumblekere et al.

(10) Patent No.: US 8,814,243 B2
(45) Date of Patent: Aug. 26, 2014

(54) CORD MANAGEMENT DEVICE

(75) Inventors: Jaikanth B Kumblekere, Rochester Hills, MI (US); Timothy V Hurt, Macomb, MI (US)

(73) Assignee: GM Global Technology Operations LLC, Detroit, MI (US)

(*) Notice: Subject to any disclaimer, the term of this patent is extended or adjusted under 35 U.S.C. 154(b) by 0 days.

(21) Appl. No.: 13/611,036

(22) Filed: Sep. 12, 2012

(65) Prior Publication Data

US 2014/0070559 A1 Mar. 13, 2014

(51) Int. Cl.
*B60R 7/00* (2006.01)

(52) U.S. Cl.
USPC ........................ 296/24.34; 296/37.8

(58) Field of Classification Search
USPC .............................. 296/24.34, 37.8, 37.1, 24.3
See application file for complete search history.

(56) References Cited

U.S. PATENT DOCUMENTS

| 8,104,816 B2* | 1/2012 | Lupton et al. ................ 296/37.1 |
| 2011/0095555 A1* | 4/2011 | Penner ........................ 296/24.34 |

* cited by examiner

*Primary Examiner* — Glenn Dayoan
*Assistant Examiner* — Melissa A Black

(57) ABSTRACT

A cord management device neatly stores a flexible cord in a storage console of a motor vehicle. The storage console has a storage channel recessed in the wall for receiving a length of the flexible cord. A flexible retainer is mounted on the wall and blocks ingress and egress to the storage channel. The flexible retainer flexes to permit insertion of the cord into the storage channel and also flexes to permit removal of the cord from the storage channel.

17 Claims, 2 Drawing Sheets

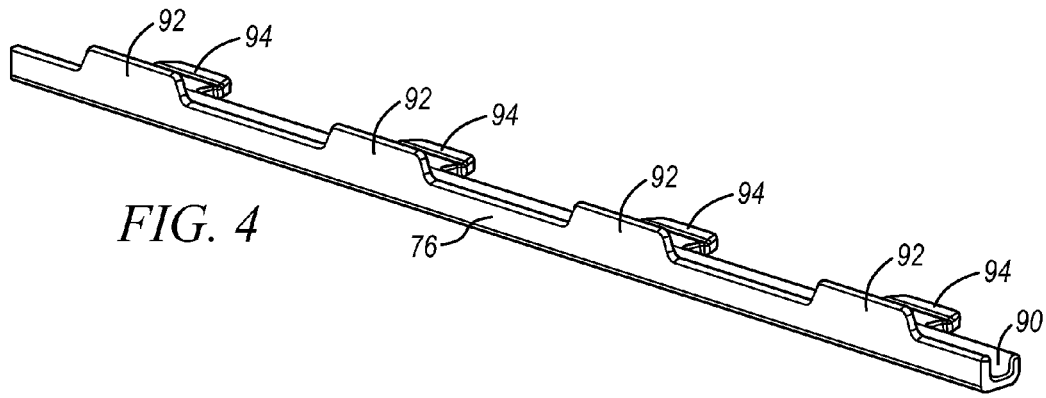
FIG. 4
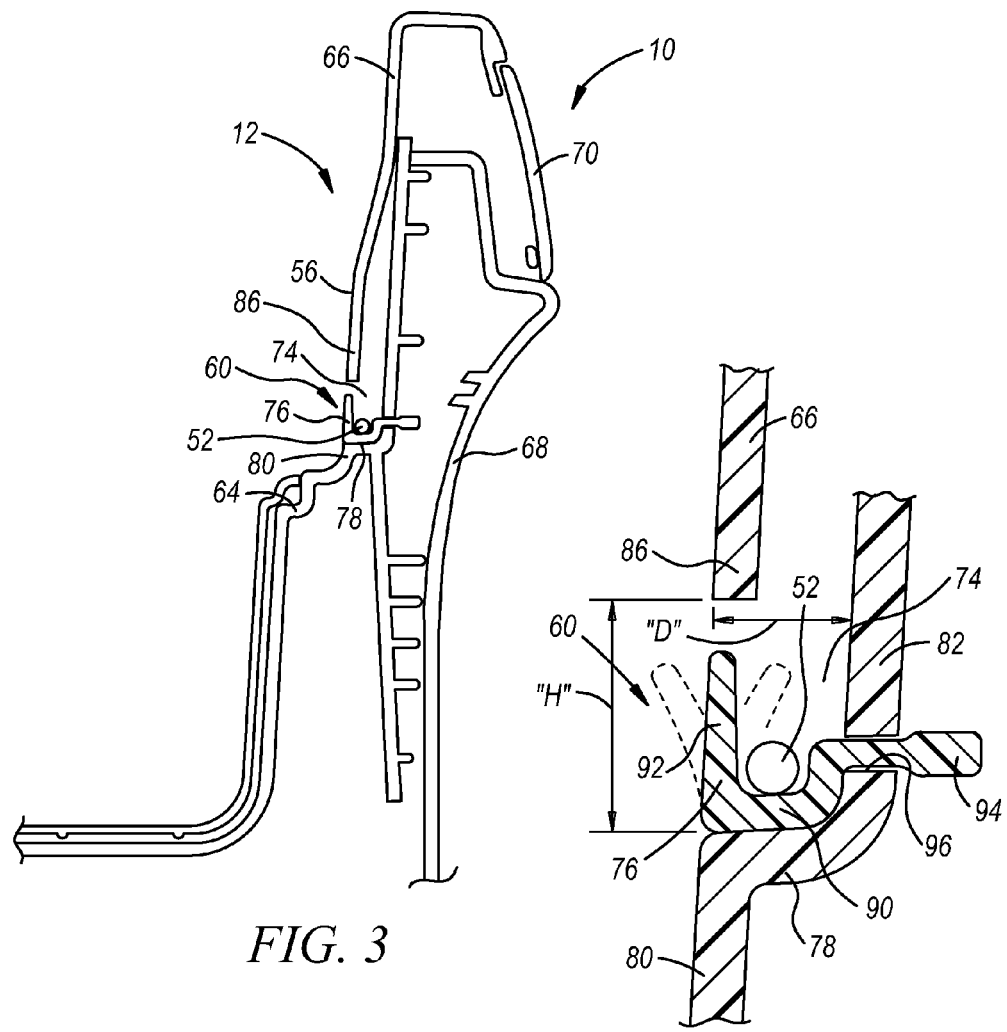
FIG. 3
FIG. 5

CORD MANAGEMENT DEVICE

FIELD OF THE INVENTION

The present invention relates to a cord management device for a motor vehicle and more particularly a storage console having a retainer for retaining a cord within a storage channel in a wall of the storage console.

BACKGROUND OF THE INVENTION

Motor vehicles are routinely equipped with a storage console. The storage console can be mounted on the seat or on the floor. The storage console can be provided within an armrest that is mounted on the vehicle or on the seat. The storage console can be provided in the front seat or the rear seat of the vehicle. Alternatively, the storage console can be an overhead console mounted on the roof. The storage console can be mounted on the instrument panel generally forward of the seated occupants. The storage console is divided into separate storage areas such as an open top bin, a cup holder, a tray, etc.

The storage console of the motor vehicle is typically used by the occupants for storage of portable electronic devices such as a cell phone, an MP3 player, GPS unit, or the like. These electronic devices are rechargeable from the vehicle electrical system and accordingly the storage console typically includes one or more electrical connectors. A recharging cord is used to connect the electronic device with the electric connector of the storage console. In the case of a cell phone or MP3 player, the vehicle may also be equipped with a connector or cord of the vehicle audio system so that music stored in the electronic device can be played over the vehicle radio system.

In each case, it is typical for a surplus length of cord to be extending from the portable electronic device to the respective connector of the storage console. The surplus length of cord will typically dangle freely, or, the vehicle user may fold or wad the cord in a bundle and then stuff the bundled cord into the storage console. The unmanaged cord can become entangled with other items being stored, and the entanglement can lead to the unmanaged cord being unintentionally unplugged from the connector.

It would be desirable to provide a device for neatly storing and managing the surplus length of cord within a storage console in order to improve occupant satisfaction with the vehicle.

SUMMARY OF THE INVENTION

A cord management device neatly stores a flexible cord in a storage console of a motor vehicle. The storage console has a storage channel recessed in a wall for receiving a length of the flexible cord. A flexible retainer is mounted on the wall and blocks ingress and egress to the storage channel. The flexible retainer flexes to permit insertion of the cord into the storage channel and also flex to permit removal of the cord from the storage channel.

Further areas of applicability of the present invention will become apparent from the detailed description provided hereinafter. It should be understood that the detailed description and specific examples, while indicating exemplary embodiments of the invention, are intended for purposes of illustration only and do not limit the scope of the invention.

BRIEF DESCRIPTION OF THE DRAWINGS

The present invention will become more fully understood from the detailed description and the accompanying drawings, wherein:

FIG. 3 is a section view taken in the direction of arrows 3-3 of FIG. 2, showing a storage channel in the side wall of the storage console and a retainer for retaining a cord in the side wall of the storage console.

FIG. 4 is a perspective view of the retainer FIG. 3.

FIG. 5 is a section view taken in the direction of arrows 5-5 of FIG. 2.

DETAILED DESCRIPTION OF THE EXEMPLARY EMBODIMENTS

The following description of certain exemplary embodiments is merely exemplary in nature and is not intended to limit the invention, its application, or uses.

Figure 1:
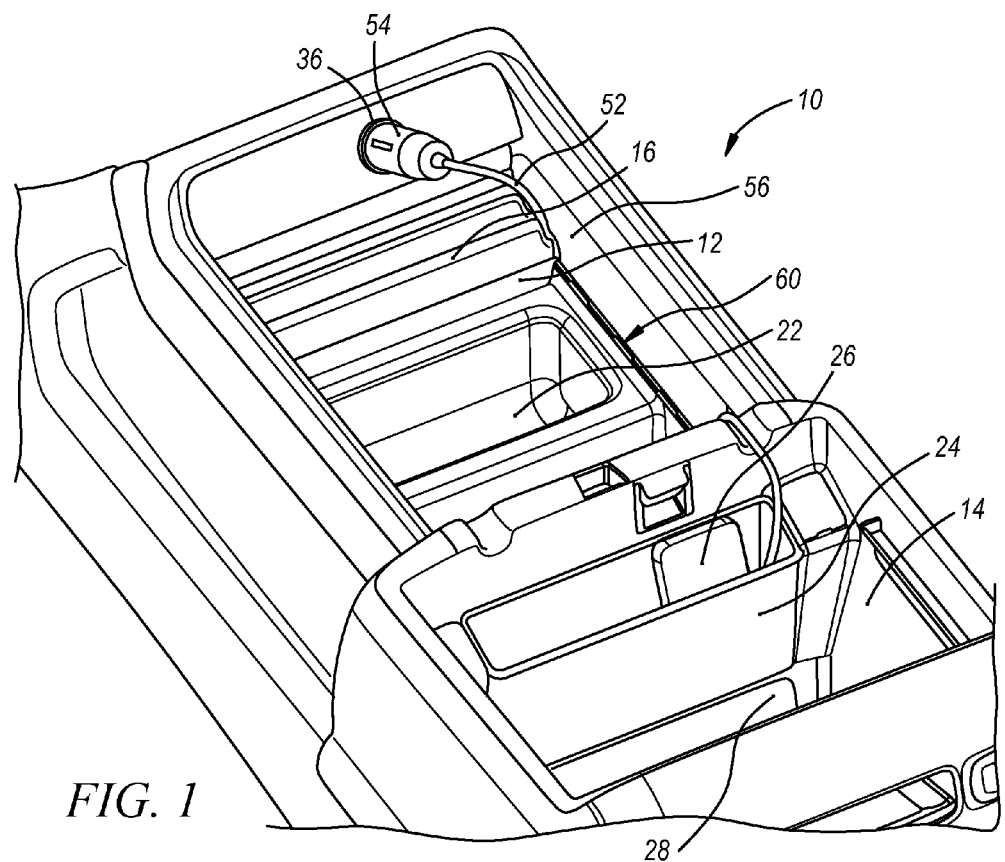
FIG. 1 is a perspective view of a vehicle storage console mounted between the seats in a motor vehicle.

Referring to FIG. 1, a storage console generally indicated at 10 is suitably mounted in a motor vehicle, for example between the driver and passenger seats. The storage console of FIG. 1 includes generally a front storage compartment 12 and a rear storage compartment 14. The front storage compartment 12 includes a tray 16 and an open top storage bin 22 for receiving and storing gloves, maps, glasses or other articles. The rear storage compartment 14 includes a tray 24 in which a cell phone 26 is standing. The rear storage compartment 14 also includes an open top storage bin 28 for receiving and storing gloves, maps, glasses, or other articles.

Figure 2:
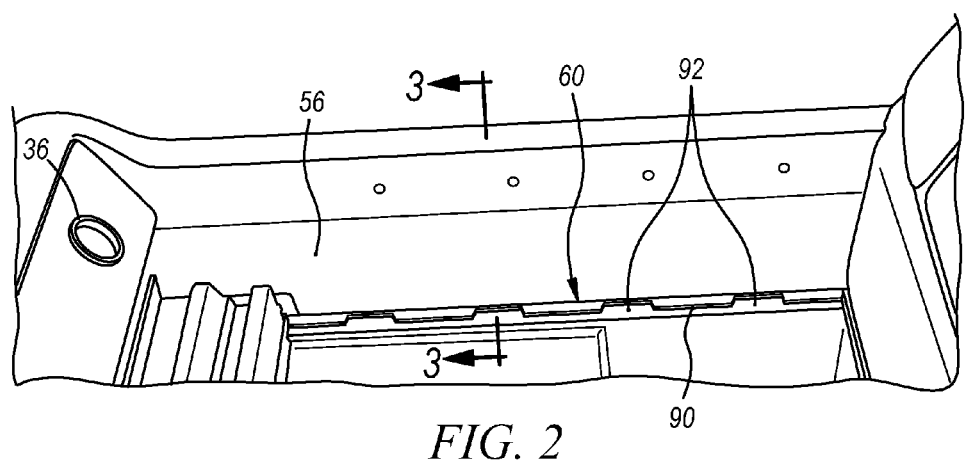
FIG. 2 is a perspective view of an enlarged fragment of FIG. 1 and showing the side wall of the storage console with a cord management device of this invention.

An auxiliary power outlet, such as a conventional cigarette lighter socket 36 is provided in the front storage compartment 12, as seen in FIGS. 1 and 2.

As seen in FIG. 1, a cord 52 is provided for charging the cell phone 26. The one end of the cord 52 is plugged into the cell phone 26. The other end of the cord 52 has a male connector 54 that is plugged into the socket 36. Accordingly, the length of the cord 52 is extending along the interior sidewall 56 of the front storage compartment 12 and is conveniently stored and retained within a cord management device, generally indicated at 60.

FIGS. 2-5 show the construction of the cord management device 60 of this invention. As seen in FIG. 3, the front storage compartment 12 of the console 10 is constructed of a number of plastic molded components including a housing panel 64, an upper trim panel 66, an outer panel 68, and a trim ring 70.

As best seen in FIGS. 2 and 3, the cord management device 60 is provided in the sidewall 56 the front storage compartment 12. The sidewall 56 is defined by housing panel 64 and upper trim panel 66. A bin liner 72 is seated within the housing panel 64.

The cord management device 60 includes a storage channel 74 provided in the sidewall 56, and a retainer 76 for retaining the cord 52 within the storage channel 74. As seen in FIG. 5, the housing panel 64 has a horizontal shelf wall 78 connecting a lower housing wall portion 80 and an upper housing wall portion 82. The horizontal shelf wall 78 creates an offset between lower housing wall portion 80 and upper housing wall portion 82, thereby defining the depth D of the storage channel 74. The upper trim panel 66 has a depending wall 86 that is spaced above the horizontal shelf wall 78 by the distance H, thereby defining the height of the storage channel 74. Thus, as seen in FIGS. 3 and 5, the storage channel 74 is recessed into the sidewall 56 and defined by the cooperation of the lower wall portion 80 defined by the housing panel 64 and an upper wall portion 82 defined by the upper trim panel 66.

The retainer 76 is shown in FIGS. 4 and 5. The retainer 76 is a molded strip formed of a flexible plastic material. As best seen in FIG. 4 the retainer defines an upwardly opening tray 90 having flexible retaining fingers 92 spaced along the length of the tray 90. A plurality of fastener tabs 94 are also molded integrally along the length of the retainer 76.

As seen in FIGS. 3 and 5, the retainer 76 is snapped into place within the storage channel 74 by inserting the plurality of fastener tabs 94 through a corresponding plurality of openings 96 provided in the upper wall housing portion 82. As seen in FIG. 5, the tray 90 of retainer 76 is resting on the horizontal shelf wall 78 and the flexible retaining fingers 92 are standing upright to partially block the access to the storage channel 74. FIG. 5 also shows the cord 52 resting on the tray 90 and thus held in place within the storage channel 74 by the presence of the flexible retaining fingers 92. As seen in FIG. 5, the flexible retaining fingers 92 can flex either inwardly or outwardly with respect to the storage channel 74 to permit the cord 52 to be either inserted into the storage channel 74 or pulled out of the storage channel 74.

Thus, the invention provides a new and improved cord management device for managing the cords of any portable electronic device such as a cell phone, MP3 player, computer, etc. The depth and width of the storage channel can be chosen to accommodate one or more cords, including cords that have a permanent coil. Although the drawings herein show the cord management device on the side wall of the storage console, the cord management device can be provided on any one or more of the walls of a storage console. More than one of these cord management devices can be included, and the console can be located anywhere in the vehicle, such as between the seats, on the door, on the overhead panel, in the glove box, on the instrument panel, etc. The socket for connecting with the cord of the portable electronic device can be any type of outlet such as USB receptacle, 120 volt receptacle, cigarette lighter receptacle, etc.

What is claimed is:

1. A cord management device for a storing a flexible cord in a storage compartment of a storage console of a motor vehicle, comprising:
   the storage console having a plurality of walls defining a storage compartment for storing articles including a portable electronic device;
   and the cord management device provided in at least one of the walls including a storage channel extending along and recessed into the at least one of the walls for housing the cord upon insertion of the cord therein and a flexible retainer mounted on the at least one wall and blocking the storage channel to retain the cord within the channel; said flexible retainer flexing to permit the insertion of the cord into the storage channel and also a removal of the cord from the storage channel, and said flexible retainer including a molded plastic strip mounted on the at least one wall along a length of the storage channel and having a plurality of flexible fingers spaced along the length thereof to block the entry and removal of the cord from the storage channel.

2. The cord management device claim 1 further comprising the at least one wall having a lower wall portion and an upper wall portion, the lower wall portion having a shelf and the upper wall portion being spaced vertically above the shelf to define the storage channel in the at least one wall.

3. The cord management device of claim 1 further comprising the plurality of flexible fingers being flexible both inwardly and outwardly relative the storage channel to respectively permit entry and removal of the cord from the storage channel.

4. The cord management device of claim 1 further comprising the flexible retainer including a molded plastic strip having a plurality of integrally molded fasteners spaced along the length thereof and the at least one wall of the console having a plurality of openings receiving the plurality of integrally molded fasteners to thereby mount the molded plastic strip on the at least one wall of the console.

5. The cord management device of claim 1 further comprising the flexible retainer including a molded plastic strip having an upwardly opening tray upon which the cord rests and plurality of flexible fingers extending upwardly from the tray to retain the cord upon the tray.

6. The cord management device of claim 5 further comprising the flexible retainer having a plurality of integrally molded fasteners spaced along the length thereof and fitted within a corresponding plurality of openings provided in the at least one wall of the console to mount the molded plastic strip on the console.

7. The cord management device of claim 6 further comprising the plurality of flexible fingers being flexible both inwardly and outwardly relative the storage channel to respectively permit entry and removal of the cord from the storage channel.

8. The cord management device claim 7 further comprising the at least one wall having a lower wall portion and an upper wall portion, the lower wall portion having a shelf and the upper wall portion being spaced vertically above the shelf to define the storage channel in the at least one wall.

9. A cord management device for storing a flexible cord in a storage compartment of a storage console of a motor vehicle, comprising:
   a storage compartment defined by a wall, the wall including a lower wall portion and an upper wall portion, the lower wall portion having a shelf and the upper wall portion being spaced vertically above the shelf to define a storage channel in the wall for receiving a length of the flexible cord; and
   a flexible retainer mounted on the wall and blocking ingress and egress to the storage channel, said flexible retainer flexing to permit insertion of the cord into the storage channel and also removal of the cord from the storage channel.

10. The cord management device of claim 9 further comprising the flexible retainer including a molded plastic strip mounted on the wall along a length of the storage channel and having a plurality of flexible fingers spaced along the length thereof to block the entry and removal of the cord from the storage channel.

11. The cord management device of claim 9 further comprising the plurality of flexible fingers being flexible both inwardly and outwardly relative the storage channel to respectively permit entry and removal of the cord from the storage channel.

12. The cord management device of claim 9 further comprising the flexible retainer including a molded plastic strip having a plurality of integrally molded fasteners spaced along the length thereof and the wall of the console having a plurality of openings receiving the plurality of integrally molded fasteners to thereby mount the molded plastic strip on the wall of the console.

13. The cord management device of claim 9 further comprising the flexible retainer including a molded plastic strip having an upwardly opening tray upon which the cord rests and plurality of flexible fingers extending upwardly from the tray to retain the cord upon the tray.

14. The cord management device of claim 13 further comprising the flexible retainer having a plurality of integrally molded fasteners spaced along the length thereof and fitted within a corresponding plurality of openings provided in the wall of the console to mount the molded plastic strip on the console.

15. The cord management device of claim 13 further comprising the plurality of flexible fingers being flexible both inwardly and outwardly relative the storage channel to respectively permit entry and removal of the cord from the storage channel.

16. The cord management device of claim 13 further comprising the wall having including a lower wall portion and an upper wall portion, the lower wall portion having a shelf and the upper wall portion being spaced vertically above the shelf to define the storage channel in the wall.

17. A cord management device for storing a flexible cord in a storage compartment of a storage console of a motor vehicle, comprising:

the storage console having a lower wall portion and an upper wall portion, the lower wall portion having a shelf and the upper wall portion being spaced vertically above the shelf to define a cord storage channel recessed in the wall for receiving a length of the flexible cord;

a molded plastic strip mounted on the wall along a length of the storage channel and having;

a plurality of integral fasteners inserted into a corresponding plurality of openings in the storage console, an upwardly opening tray resting on the shelf and upon which the cord rests, and a plurality of flexible fingers spaced along the length thereof to block the entry and removal of the cord from the tray.

* * * * *